June 19, 1956 L. F. DURRELL 2,751,122
SHAKER DEVICE
Filed Oct. 2, 1953
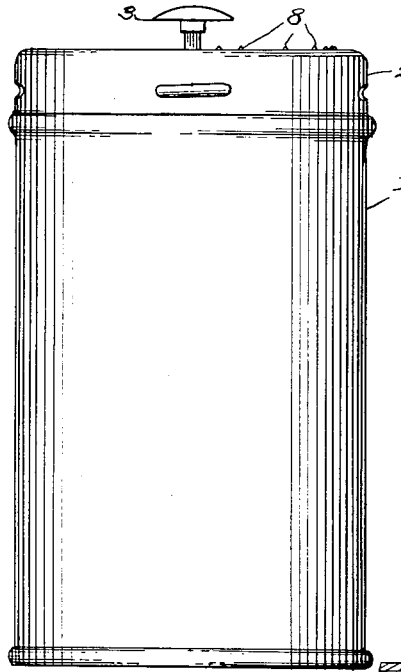
Fig.1.
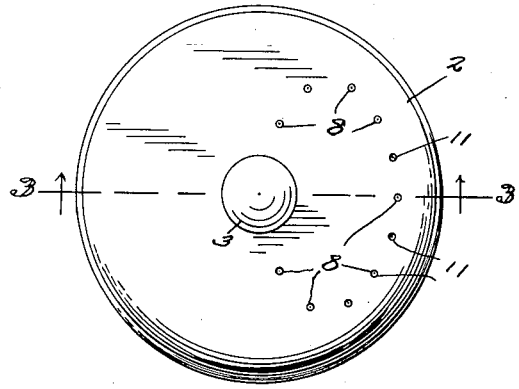
Fig.2.
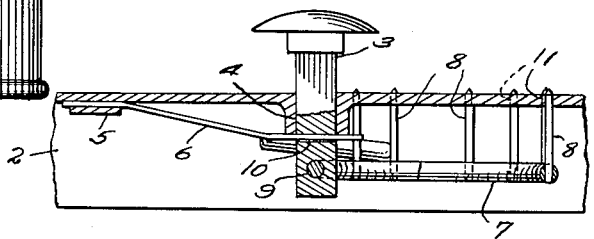
Fig.3. Fig.4.
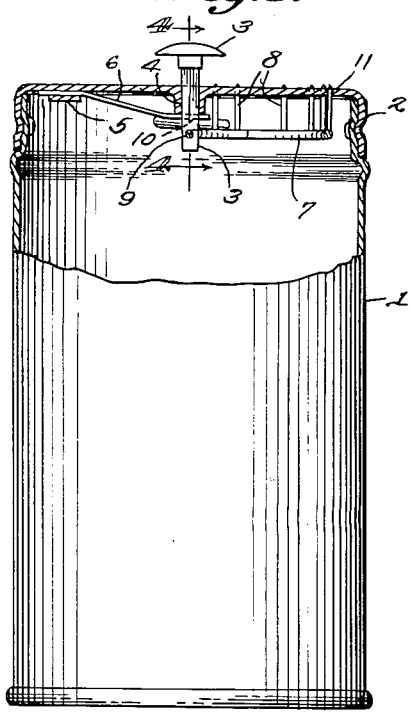
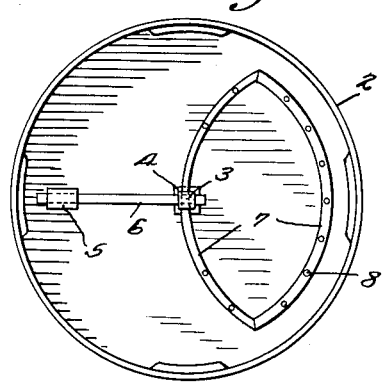
Fig.5.
Louis F. Durrell
INVENTOR
BY C.A.Snow&Co.
ATTORNEYS.

United States Patent Office

2,751,122
Patented June 19, 1956

2,751,122
SHAKER DEVICE

Louis F. Durrell, San Antonio, Tex.

Application October 2, 1953, Serial No. 383,770

1 Claim. (Cl. 222—149)

This invention relates to a shaker device.

An object of this invention is the production of a shaker device which will keep the contents of the container dry at all times.

An object of this invention is to provide a container for salt, pepper or the like, with means normally closing the apertures in the cap or cover, thereby keeping the apertures clean for free flowing, when the container is being used.

A still further object of this invention is the provision of a shaker device, that is efficient, easy to operate and comparatively inexpensive to manufacture.

With the foregoing and other objects in view, this invention comprises certain novel constructions, combinations and arrangement of parts as will hereinafter be fully described, illustrated in the accompanying drawings, and more particularly pointed out in the appended claim.

In the drawings:

Figure 1 is a view in side elevation of a shaker device.

Figure 2 is a top plan view.

Figure 3 is partly a view in elevation and partly a view in vertical section.

Figure 4 is a vertical sectional view taken on lines 4—4 of Fig. 3.

Figure 5 is a bottom plan view of the cap or cover.

Referring to the drawings in which the preferred specie of this invention is illustrated, in Figures 1 to 5, 1 designates a container and 2 is the cap or cover thereof. The container 1 and cover 2 may be formed of any suitable material, such as plastic, if desired.

Secured to the inner face of the cover 2 is a four sided hole or opening 4 and extending through this opening and guide is a slidable plunger 3, said plunger being four sided and guided by plunger guide 4, thus giving guiding means at all times. Said plunger has an aperture on lower end 9 to which is connected a horizontal yoke 7 which is provided with preferably eleven vertically extending prongs 8; each prong is pointed at its upper end, its pointed end extends into an aperture as shown in Fig. 2. There are as many apertures in the cover 2 as there are prongs 8.

On cover 2 there is a spring holder 5 in which is fastened a steel spring 6, said spring passes through opening 10 of the plunger 3 below plunger guide 4 giving pressure upwards to plunger 3 and connected yoke 7. Therefore when the plunger grip 3 is not engaged, the springs 6 will hold the entire yoke 7 with all the prongs 8 firmly in all the apertures, Fig. 2, whereby a tight closure is formed resulting in keeping the contents of the container dry. The prongs act as a cleansing device for keeping the apertures of the cover free from any accumulation. It will be understood that every time the operator manipulates the device there will be a rubbing action in the apertures 1 to 11 by the frictional engagement of the prongs in the apertures, which will keep said apertures clean, resulting in a free flowing of the contents when the shaker device is in use.

While I have described the preferred embodiments of the invention and illustrated the same in the accompanying drawings, certain minor changes or alterations may appear to one skilled in the art to which this invention relates during the extensive manufacture of same, and I therefore reserve the right to make such changes or alterations as shall fairly fall within the scope of the appended claim.

What I claim is:

A condiment shaker comprising a container, a perforated cap closing said container, a bearing depending from the inner surface of said cap, said bearing having a rectangular bearing opening, a plunger extending a substantial distance beyond the end of said bearing, a horizontal yoke rigidly secured to said plunger within said cap and extending laterally from said plunger, prongs extending from said yoke, normally disposed within said perforations of the cap, said plunger having a transversely disposed opening below said bearing, a leaf spring having one of its ends secured to the inner side of said cap, the other end of said leaf spring being slidably mounted within said opening of said plunger, said spring adapted to normally bias said yoke towards the cap forcing said prongs through said perforations, clearing said perforations, said spring adapted to contact one end of said bearing restricting outward movement of said plunger, and said plunger adapted to move said yoke inwardly retracting the prongs from said perforations.

References Cited in the file of this patent

UNITED STATES PATENTS

| | | |
|---|---|---|
| 600,262 | Hamfeldt | Mar. 8, 1898 |
| 810,107 | Cohencius | Jan. 16, 1906 |
| 1,161,489 | Long | Nov. 23, 1915 |
| 1,227,331 | Slade | May 22, 1917 |
| 1,231,761 | Lofstrom | July 3, 1917 |
| 2,045,926 | Reutter | June 30, 1936 |
| 2,496,193 | Benedict | Jan. 31, 1950 |
| 2,694,512 | Morris | Nov. 16, 1954 |

FOREIGN PATENTS

| | | |
|---|---|---|
| 8,331 | Great Britain | Apr. 6, 1910 |
| 618,539 | Great Britain | Feb. 23, 1949 |